United States Patent [19]

Tretter et al.

[11] Patent Number: 4,646,305
[45] Date of Patent: Feb. 24, 1987

[54] HIGH SPEED DATA MODEM USING MULTILEVEL ENCODING

[75] Inventors: Steven A. Tretter, Silver Springs; Robert P. Redick, Chevy Chase; Richard L. Stuart, Columbia; Paul E. Treynor, New Carrollton; David Gordon-Smith, Columbia, all of Md.

[73] Assignee: Case Communications, Inc., Columbia, Md.

[21] Appl. No.: 535,636

[22] Filed: Sep. 26, 1983

[51] Int. Cl.$^4$ .................. H04L 5/12; G06F 11/10
[52] U.S. Cl. ........................................ 371/43; 375/39
[58] Field of Search ............ 371/2, 43; 375/42, 39, 375/53, 56, 57, 15, 96, 18

[56] References Cited

U.S. PATENT DOCUMENTS

| | | | |
|---|---|---|---|
| 3,388,330 | 6/1968 | Kretzmer | 375/18 |
| 3,887,768 | 6/1975 | Forney et al. | 375/42 |
| 4,123,710 | 10/1978 | Stuart et al. | 375/39 |
| 4,271,527 | 6/1981 | Armstrong | 375/39 |
| 4,327,439 | 4/1982 | Göckler | 375/39 |
| 4,346,473 | 8/1982 | Davis | 371/2 |
| 4,464,767 | 8/1984 | Bremer | 375/39 |
| 4,466,109 | 8/1984 | Sari | 375/39 |
| 4,483,012 | 11/1984 | Wei | 375/39 |
| 4,484,338 | 11/1984 | Clark et al. | 371/43 |

OTHER PUBLICATIONS

A. J. Viterbi & J. K. Omura, Principles of Digital Communication and Coding, McGraw-Hill, 1979, pp. 295–298.
S. Qureshi, "An Adaptive Decision-Feedback Receiver Using Maximum-Likelihood Sequence Estimation," Proceedings of the 1973 ICC, pp. 14–10 to 14–16.
S. Qureshi and E. E. Newhall, "An Adaptive Receiver for Data Transmission Over Time-Dispersive Channels," IEEE Transactions on Information Theory, vol. IT-19, No. 4, Jul. 1973, pp. 448–457.
D. D. Falconer & F. R. Magee, Jr., "Adaptive Channel Memory Truncation for Maximum Likelihood Sequence Estimation," Bell System Technical Journal, vol. 52, No. 9, Nov. 1973, pp. 1541–1562.
J. G. Smith, "Odd-Bit Quadrature Amplitude-Shift Keying," IEEE Transactions on Communications, Mar. 1975, pp. 385–389.
F. R. Magee, Jr., "A Comparison of Compromise Viterbi Algorithm and Standard Equalization Techniques Over Band-Limited Channels," IEEE Transactions on Communications, vol. COM-23, No. 3, Mar. 1975, pp. 361–367.

(List continued on next page)

Primary Examiner—Michael R. Fleming
Attorney, Agent, or Firm—Saidman, Sterne, Kessler & Goldstein

[57] ABSTRACT

A 14.4 kilobit/second modem uses an encoding scheme in which groups of five bits are encoded as one of thirty-two ($2^5$) possible code groups. This is done by using quadrature amplitude modulation and a 6 by 6 space-state constellation which allows a maximum of thirty-six different points to be encoded. Since only thirty-two points are needed the four outer corner points of the

OTHER PUBLICATIONS constellation are not used. In order to achieve the desired 14.4 KBPS data rate the baud clock must run at 2880 Hz. However, this bandwidth is very close to the maximum bandwidth available on voice-grade telephone lines. Accordingly, data encoding and data recovery techniques must be used which maximize the probabilities of correctly receiving the encoded data signals. These techniques include (1) data scrambling-/descrambling; (2) assigning groups of five bits to constellation points, including performing rotational and Gray encoding; (3) a baud clock recovery scheme at the receiver which is performed prior to partial response encoding; and (4) a start-up technique using a three-level partial response ideal reference sequence during initial training at the receiver. In addition, the invention uses passband equalization, class I partial response encoding accomplished by the passband equalizer, and independent inphase and quadrature Viterbi decoders at the receiver.

17 Claims, 8 Drawing Figures

A. Lender, "The Duobinary Technique for High Speed Data Transmission," IEEE General Winter Meeting, 1963, Conf. Paper CP63-283.

A. Lender, "Correlative Level Encoding for Binary Data Transmission," IEEE Spectrum, Feb. 1966.

E. Kretzmer, "Generalization of a Technique for Binary Data Communication," IEEE Transactions on Communication Technology.

A. S. Acampora, "Analysis of Maximum Likelihood Sequence Estimation Performance for Quadrature Amplitude Modulation," The Bell System Technical Journal, vol. 60, No. 6, Jul.-Aug. 1981, pp. 865-885.

E. E. Arshadnia & S. A. Tretter, "Performance of a QAM Communication System Using a 32 Point Signal Constellation with Partial Response Encoding and Viterbi Decoding".

IBM Europe, "Proposal for a 14,400 Bit Per Second Modem for Use on 4 Wire Telephone Circuits," CCITT, Feb. 1983.

P. Treynor, "Modem Uses Microprocessor to Achieve 9600 bps on Voice Channel,", Tele. Eng. and Manag., Apr. 1, 1980.

D. N. Godard, "Passband Timing Recovery in an All Digital Modem Receiver," IEEE Transactions on Communications, vol. 26, No. 5, May 1976.

11×11 PARTIAL RESPONSE QAM SIGNAL

Fig. 7

TRELLIS FOR AN M LEVEL DECODER

Fig. 8

HIGH SPEED DATA MODEM USING MULTILEVEL ENCODING

BACKGROUND OF THE INVENTION

The invention relates to high speed data communication on band-limited channels, and more particularly to the transmission of data at 14,400 bits per second on voice band channels having a passband of approximately 300 to 3000 Hertz.

Figure 3:
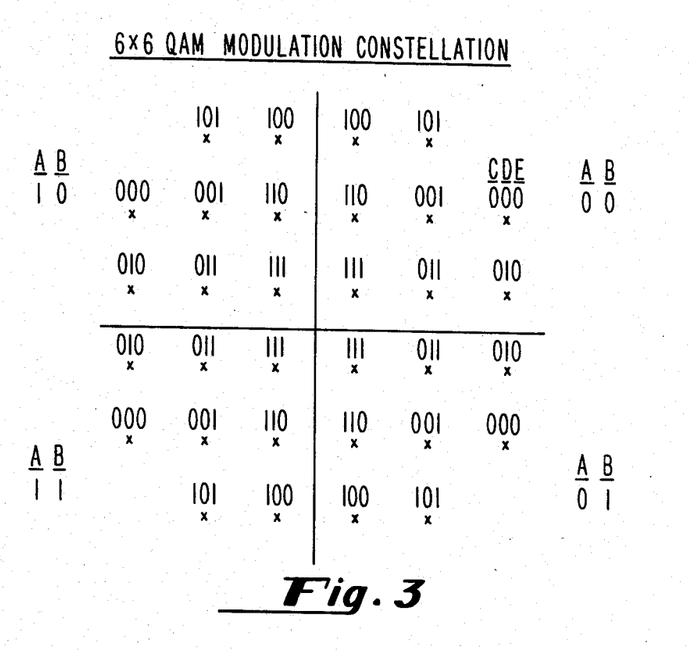
FIG. 3 shows a 6 by 6 QAM constellation and point assignment in accordance with the present invention.

Modulation techniques which have evolved for obtaining higher data rates over telephone voice channels of 300 to 3000 Hertz bandwidth generally rely upon quadrature amplitude modulation (QAM). In this technique, two carrier waves, at the same frequency but 90° out of phase are independently modulated, and at the receiver are independently demodulated. Such a scheme is well-known and is described in detail in "Information Transmission, Modulation and Noise", by Mischa Schwartz, Third Edition, McGraw Hill Book Co., pages 226-235. This reference discloses a 4 by 4 QAM state space or constellation which is widely used in the United States for 9600 bit per second transmission over voice channels. Also disclosed by this reference is a technique which is used for both domestic and foreign 9600 bit per second transmission over voice channels. This latter system is described in U.S. Pat. No. 3,887,768 and its associated constellation is shown in FIG. 3B of this patent. These 16 state systems reduce bandwidth by taking groups of 4 bits and assigning them to each of the 16 states. In general the total bandwidth required by such a system is $$\text{Total Bandwidth} = \frac{\text{Bit Rate}}{N}$$

where N=Bits/Baud

Thus the above 9600 bit per second system requires 2400 Hz minimum bandwidth. Other constellations for high speed modems are also disclosed in U.S. Pat. No. 3,983,485.

For data rates above 9600 bits per second, constellations of more than 16 states are normally required to restrict bandwidth to the limits of a voice channel. For example, an 8 by 8 QAM system (64 states) operating at 14,400 bits per second encodes 6 bits per baud, so from the preceding equation the total bandwidth required is 2400 Hertz (the same as the 9600 bit per second systems previously described). This allows 14,400 bits per second (BPS) transmission through a voice channel. Due to the closer packing of states in a 8 by 8 QAM system, the error rate for a given noise level will be poorer than the 4 by 4 QAM previously cited. See also U.S. Pat. No. 4,271,527 which shows two slightly modified 4 by 4 QAM systems for 14,400 BPS transmission.

In U.S. Pat. No. 4,123,710 a modulation technique employing two six level baseband systems which are partial response encoded to produce two eleven level systems are discussed. The signals then modulate two carriers in phase quadrature to produce an 11 by 11 QAM signal constellation.

SUMMARY OF THE INVENTION

It is the object of the present invention to provide an improved method and apparatus for enabling accurate and reliable data communications to be performed at 14,400 bits per second. In order to achieve this object, a data stream at 14,400 bits per second is encoded by grouping five bits at a time into one of 32 levels in a 6 by 6 quadrature amplitude modulation (QAM) system. Since 32 states are required for 5 bit grouping ($2^5=32$) and the 6 by 6 QAM allows 36 states, 4 states may be deleted. The transmitted signal is a 6 by 6 QAM signal with the 4 corner states omitted. This signal is applied to the band-limited telephone channel and arrives at the receiver. The receiver employs an adaptive equalizer/filter to force this 6 by 6 QAM signal to an 11 by 11 QAM signal.

The 11 by 11 QAM signal is then demodulated in a conventional manner, such as described in U.S. Pat. No. 3,878,468.

The demodulated output is applied to a forward error corrector which corrects many of the errors produced by the channel. This error corrector utilizes the convolutional redundant characteristics inherent in partial response encoded signal to correct errors. The Viterbi algorithm is employed in a decoder to perform the error correction functions.

BRIEF DESCRIPTION OF THE DRAWING FIGURES

These and other features and advantages of the present invention will be apparent from the following detailed description of the preferred embodiment, when taken in conjunction with the accompanying drawing figures, wherein.

DETAILED DESCRIPTION OF THE PREFERRED EMBODIMENT

Figure 1:
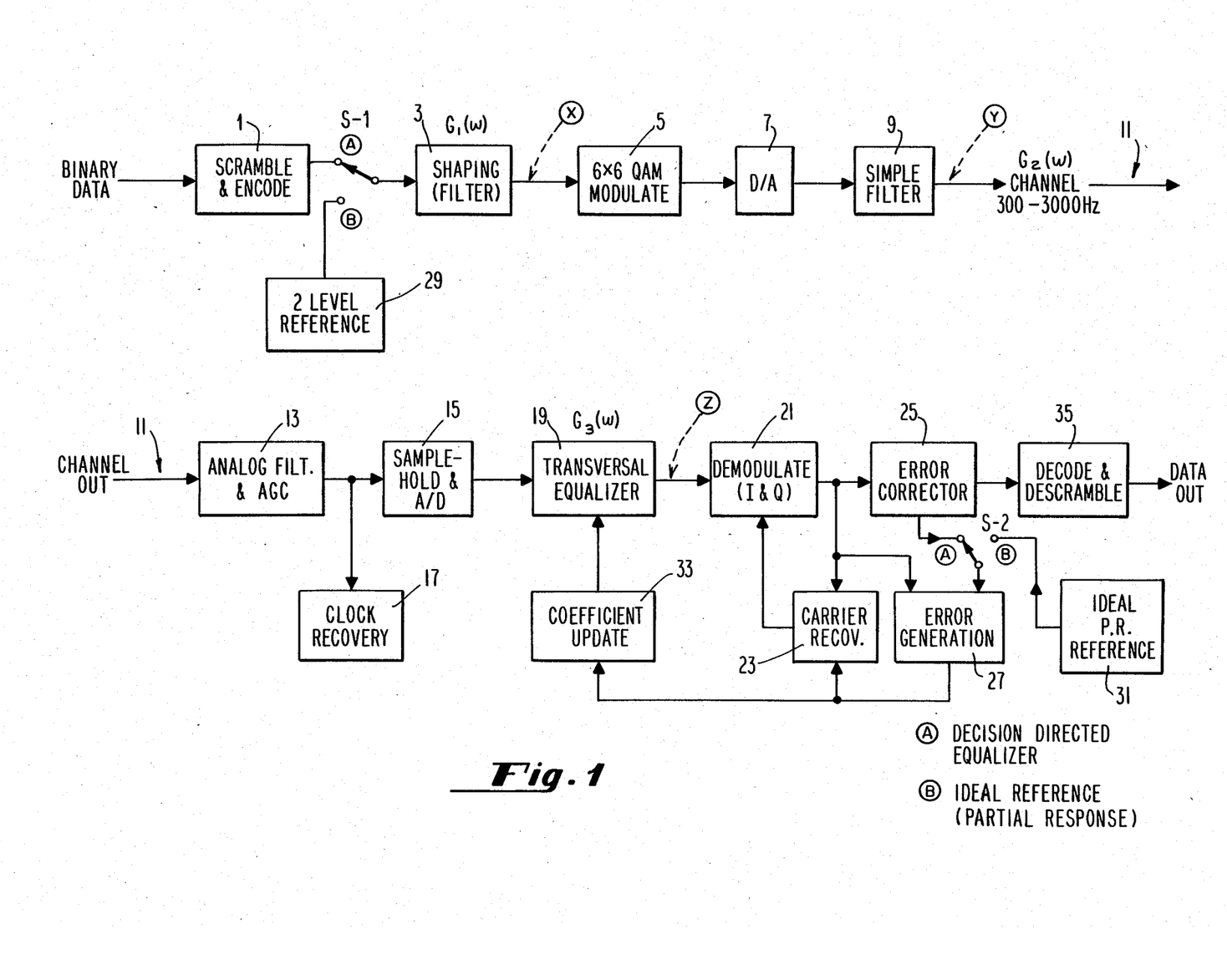
FIG. 1 is an overall block diagram showing a transmitter and receiver constructed in accordance with the present invention.

FIG. 1 shows a block diagram of a transmitter and receiver constructed in accordance with the invention. The hardware basis of the invention is three bit slice microprocessors which are suitably programmed to act as digital signal processors (DSP). One processor is used in the transmitter and one in the receiver. The third processor is also located in the receiver to perform the error correction function by employing the Viterbi algorithm.

Referring to FIG. 1, a binary data stream is applied to a data scrambler and encoder 1, and a shaping filter 3 (which can be suitably implemented by programming of a digital signal processor such as a microprocessor). At the point marked by X in the figure, there are two band-limited signals I (inphase) and Q (quadrature). These baseband six level signals have the approximate "brick wall" spectrum shown by dotted lines in the right-hand graph shown in FIG. 2. More precisely, the signals approximate a brick wall filter with a 12% excess bandwidth raised cosine function.

The invention employs a quadrature modulation (QAM) scheme. In this technique, two carriers at the same frequency, but in phase quadrature, are independently modulated and transmitted through the channel, then separately demodulated. More particularly, after shaping by filter 3, the encoded data stream is applied to QAM modulators 5 where the six level signals, I and Q, are multiplied by sin $w_c t$ and cos $w_c t$ respectively.

In U.S. Pat. No. 4,123,710 a partial response QAM modem is described, and in FIG. 4 of that patent, an 11 by 11 partial response constellation is shown. In that patent an 11 by 11 partial response signal is transmitted. In the present invention, a 6 by 6 QAM signal is transmitted. The transmitted constellation is shown in FIG. 3. It is seen that the corner states are omitted. This leaves 32 states which allows each state to represent 5 bits of data ($2^5 = 32$). Gray coding is used to minimize error propagation and differential quadrant encoding is employed so that absolute carrier phase need not be recovered at the receiver. These encoding functions are provided by encoder 1.

In differential encoding data bits are encoded and transmitted in blocks of 5 bits per baud. Each bit in the block is assigned a label A through E starting with the most significant bit as A. To minimize errors, and in the event of a loss of carrier phase information, only the quadrant determining bits A and B need to be differentially encoded. This is done using modulo-2 arithmetic according to the rules:

$$EA(I) = EA(I-1).XOR.AS(I).XOR.\underbrace{(EB(I-1).AND.BS(I))}_{CARRY}$$

$$EB(I) = EB(I-1).XOR.BS(I)$$

Where AS(I) and BS(I) are current baud A and B bits and EA(I-1) and EB(I-1) are previously encoded bits.

If EB(I)=1 (the B bit prior to quadrant Gray coding) the C, D and E bits are rotationally encoded if the constallation point is off the diagonal as follows:

| C | D | E |   | C | D | E |
|---|---|---|---|---|---|---|
| 1 | 0 | 1 | ⟵ | 0 | 0 | 0 |
| 1 | 0 | 0 | ⟵ | 0 | 1 | 0 |
| 1 | 1 | 0 | ⟵ | 0 | 1 | 1 |

If EB(I)=0 prior to Gray encoding of the quadrant bits, bits C, D and E go unchanged.

In order to minimize errors, as part of the overall encoding scheme of the present invention, the quadrants of the 6 by 6 constellation of FIG. 3 are Gray encoded according to the rules:

TA(I)=EA(I)

TB(I)=EA(I).XOR.EB(I)

The number of possible transitions within a quadrant are 10 which exceeds the eight different states possible for a 3-bit word. The internal quadrant points cannot, therefore, be perfectly Gray encoded. The arrangement chosen for the present invention has been devised specifically to favor the outermost constellation points. This is because it is believed that these are the most likely to be corrupted under the conditions most likely appearing on present day communication channels. FIG. 3 shows the constellation coding assignments used in the present invention.

After being applied to QAM modulator 5, the data representative signal is applied to a digital to analog converter 7, followed by a simple smoothing filter 9. The data representative signal is then applied to the communications channel 11. At the point Y of FIG. 1 the transmitted spectrum is like that indicated by the dotted line of FIG. 4, and has a constellation like that of FIG. 3.

At the channel output, the signal is applied to the receiver analog filter and automatic gain control circuit (AGC) 13, then to the sample and hold and analog to digital converter circuit 15. Clock recovery is performed after initial filtering by circuit 13 by clock recovery circuit 17. From this point on, all signal processing is digital utilizing the receiver's digital signal processor.

Figures 4, 5:
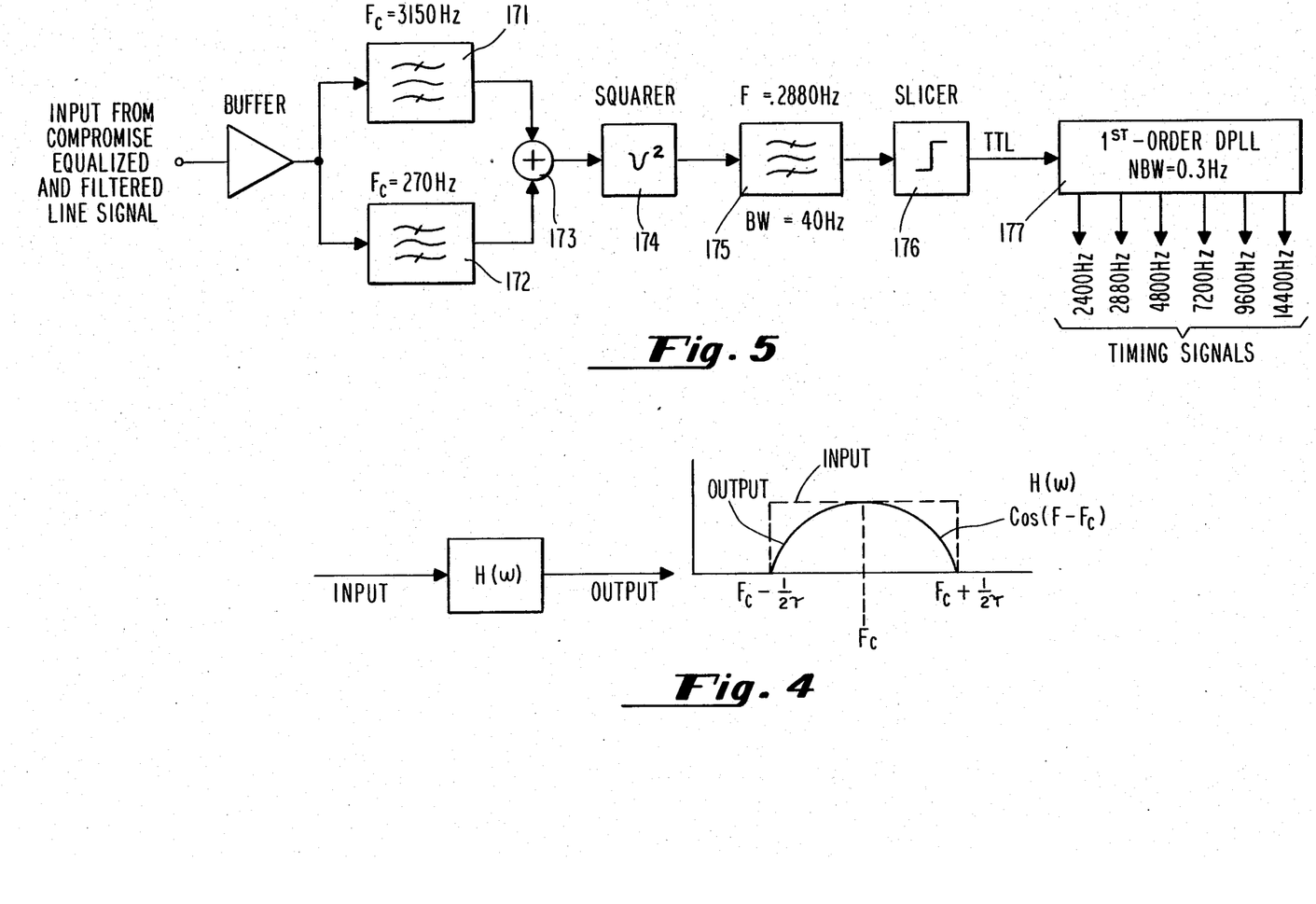
FIG. 4 illustrates the spectrum of a signal transmitted by the present invention.
FIG. 5 is a block diagram of the clock recovery system used in the present invention.

Referring to FIG. 5, the clock recovery circuit 17 is shown in more detail. The timing frequency and phase are derived from the square of the envelope of the unequalized passband line signal. Spectral components around the upper and lower Nyquist frequencies are selected by filters 171 and 172 and summed by summer 173. Filters 171 and 172 are second-order bandpass, 40 Hz wide at the half-power points. The output of summer 173 feeds a squaring circuit 174 that provides frequency components at the sum, difference and second harmonic frequencies. The desired timing information is contained in the difference component at 2880 Hz and this is selected by another second-order bandpass filter 175 tuned to 2880 Hz. The output of filter 175 is sliced to TTL (transistor-transistor logic) levels by slicer 176. An internally generated 2880 Hz signal is locked to the derived 2880 Hz signal from a digital phaselock loop (DPLL) 177. The DPLL is 1st-order and has a noise bandwidth of approximately 0.3 Hz. The DPLL also provides timing signals at 2400, 4800, 7200, 9600, and 14,400 Hz.

Referring back to FIG. 1, the signal output from A/D converter 15 is next applied to transversal equalizer 19. Transversal equalizer 19 can be adjusted to create a wide range of transfer functions by application of an appropriate set of coefficients thereto. In the present invention, the transversal equalizer adjusts its transfer function, $G_3(W)$, so that in cascade with channel 11, whose transfer function is $G_2(W)$, the overall transfer function becomes H(W) as shown by the solid curve of FIG. 4. The transfer function H(W) acts on the received 6 by 6 QAM signal to produce a partial response 11 by 11 QAM signal. Mathematically, $H(W) = G_2(W) \times G_3(W)$. Thus at point Z of FIG. 1 the spectrum is H(W) as shown by the solid curve of FIG. 4.

An advantage of using the partial response characteristics of the equalizer is that the communication channel (typically a telephone line) has higher attenuation at the band edges and so the transversal equalizer is usually only required to provide additional band edge attenuation and linearizes the phase characteristic. For those reasons, this arrangement is highly immune to the amplitude attenuation at the channel band edges.

Figure 2:
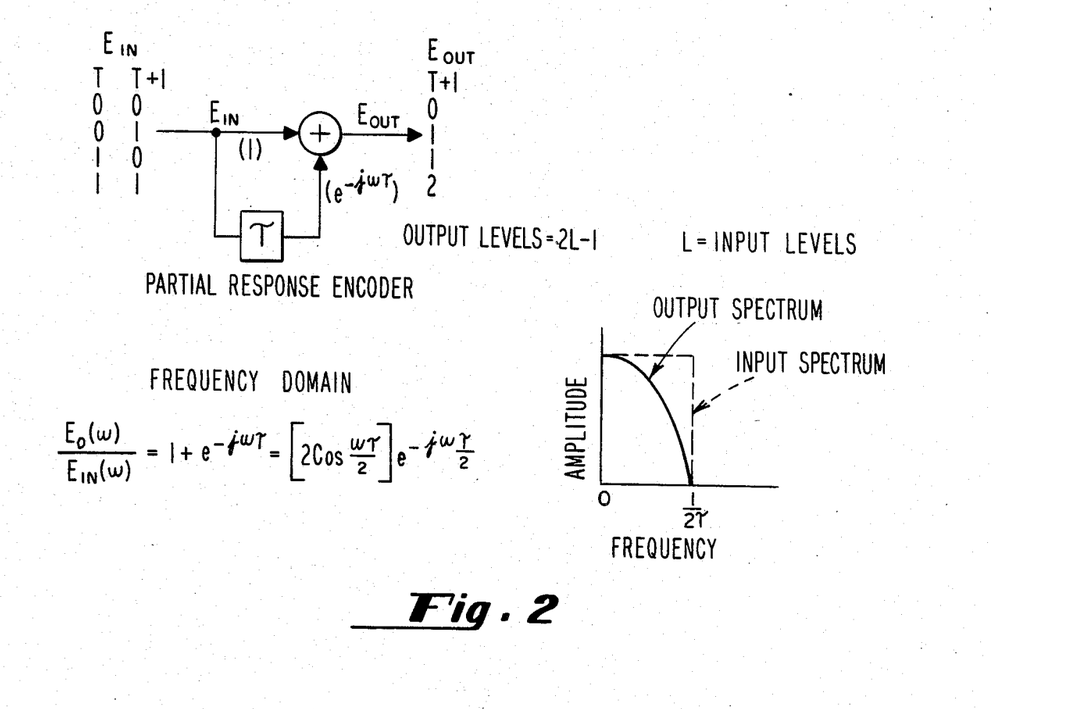
FIG. 2 illustrates partial response encoding of a data signal and the resultant signal spectrum.

Next, the method in which transversal equalizer 19 forces the partial response is considered. Referring to the block diagram of FIG. 2, a two level signal is converted to a 3 level partial reponse signal. A binary data signal is added to itself with a one bit delay as shown. It is seen that a two level (binary) input signal, consisting for example of b 1 volt and zero volts, becomes a three level signal of 0, 1, or 2 volts. For example a sequence of (0) 0 1 1 0 1 0 1 1 0 1 1 0 0 (binary)

becomes 0 1 2 1 1 1 1 2 1 1 2 1 0 (3 level)

Figure 7:
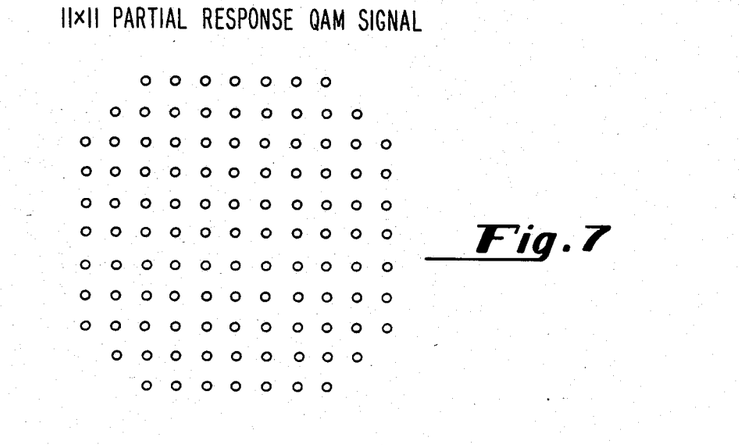
FIG. 7 illustrates the constellation of an 11 by 11 partial response QAM signal.

The above technique can be extended to any multilevel input signal for which the output number of signal levels M becomes $M = 2L - 1$, where L = the number of input levels For example, a 6 input level signal yields an 11 level output level signal. Thus the 6 by 6 QAM signal will be forced into an 11 by 11 QAM constellation by partial response encoding. The resultant constellation is shown in FIG. 7.

Another property of this encoding system is that bandwith is limited as illustrated by the graph shown in FIG. 2. From the figure, an input signal with a spectrum constant to $\frac{1}{2}\tau$ Hertz (there $\tau$ is the period of one bit) will have its spectral amplitude changed to a 2 Cos (W$\tau$)/2 function (where W is angular frequency), and its phase characteristic will remain linear with the phase angle $\phi = W\tau/2$ radians. This reduction of the levels at frequencies near F$\tau$/2 makes the partial response system less critical to high end roll off of the channel. From the above frequency domain characteristics, it is apparent that applying a binary or multilevel signal to any network configuration which has an overall frequency of cos W$\tau$/2 and a linear phase characteristic will produce a partial response signal at the output. This is shown by FIG. 6.

Figure 6:
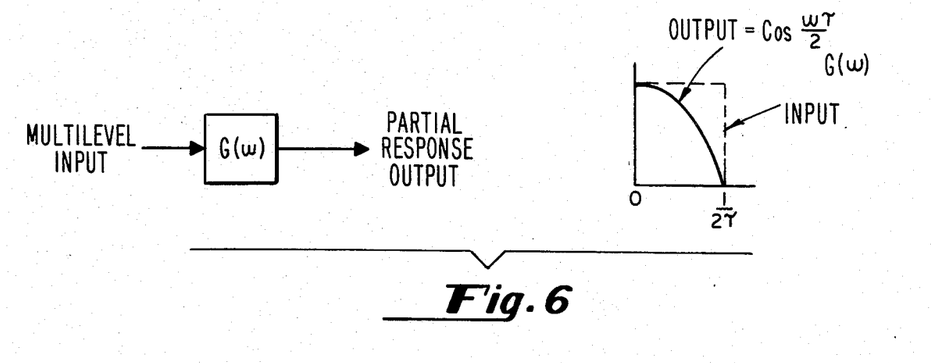
FIG. 6 illustrates a signal spectrum resulting from partial response encoding.

The foregoing discussion of FIGS. 2 and 6 have been with regard to a baseband data signal. Consider next a multilevel signal with a bandwidth from 0 to $\tau$/2 Hertz which amplitude modulates a carrer $F_c$. The spectrum of this signal will occupy the frequency range of $F_c \pm \tau/2$ Hertz. If this signal is applied to a linear phase network having a symmetrical amplitude characteristic of Cos (F − $F_c$) over the signal spectrum then a partial respose passband signal will be produced. Application of this passband partial response shaping is one of the unique aspects of the invention.

After application to transversal equalizer 19, the partial response encoded data signal is applied to demodulator 21 which demodulates the in phase (I) and quadrature (Q) components of the signal in a conventional manner. Carrier recovery for the demodulator is performed by carrier recovery circuit 23. The demodulator signal is then applied to error corrector 25 which, along with error generator circuit 27, is used to perform forward error correction for errors due to, for example, the characteristics of the particular data communications channel 11 utilized. In addition, a unique start-up or initialization procedure is used to initially adapt the transversal equalizer 19 to the characteristics of the data communications channel.

Referring to FIG. 1, during start-up of communication, switch S−1 is placed in position B. This applies a binary sequence to transmitter from a two-level reference signal generator 29 which is then transmitted over the data communications channel. The binary sequence can be applied once or repeated as many times as desired. In one embodiment of the invention the sequence is repeated three times.

At the receiver during start-up, switch S2 is placed into position B. This applies an ideal reference sequence from reference sequence generator 31 to the error generation circuit 27. Note that the reference sequence at the receiver is not the two level transmitted reference but is the 3 level signal which would be created by partial response encoding the transmitted reference. Any difference between the transmitted sequence and the ideal sequence is used to adjust the transversal equalizer 19 by adjusting the coefficient updating circuit 33 which applies coefficients to equalizer 19 to initially adapt the equalizer to the desired overall channel characteristics, H(W).

Later during the initialization period, switch S2 is placed in position B for decision directed (real-time) setting of the equalization coefficients (by means of error corrector 25, error generation circuit 27, and coefficient updating circuit 33) and switch S1 at the transmitter is placed in position A which allows data transmission.

After passing through error corrector 25, the demodulated signal is decoded and descrambled by decoder/descrambler circuit 35. The decoding function is performed using the Viterbi algorithm. The descrambling function is merely the reverse of that performed by the scrambler 1 in the transmitter.

With respect to the decoding of the signal, it is known that the Viterbi algorithm can be used for decoding partial response encoded data (see A. J. Viterbi, "Error Bounds for Convolutional Codes and Asymptotically Optimum Decoding Algorithm", IEEE Transactions on Information Theory, Vol. IT-13, April 1976, pp. 260–269). This algorithm was initially proposed for decoding a class of binary error correcting codes known as convolutional codes. In the case of the Viterbi algorithm extra bits are inserted in the data stream to provide the redundancy that allows error correction. Partial response encoding is similar to convolutional encoding except that extra levels are added to the symbol stream rather than extra bits. The Viterbi algorithm is used to maximize the likelihood decoding of the received levels.

The details of the Viterbi algorithm and the implementation of the decoder utilized in decoder 35 are well-known to those skilled in the data communications art. See, for example, D. G. Forney, Jr., "Maximum-Likelihood Sequence Estimation of Digital Sequences in the Presence of Intersymbol Interference, IEEE Transactions on Information Theory, Vol. IT-18, No. 3, May 1972, pp. 363–378; H. Kobayashi, "Correlative Level Coding and Maximum-Likelihood Decoding", IEEE Transactions on Information Theory, Vol. IT-17, No. 5, September 1971, pp. 586–594; D. D. Falconer and F. R. Magee, Jr., "Evaluation of Decision Feedback Equalization and Viterbi Algorithm Detection for Voiceband Data Transmission-Part I", IEEE Transactions on Communications, Vol. COM-24, No. 10, October 1976, pp. 1130–1139; D. D. Falconer and F. R. Magee, Jr., "Evaluation of Decision Feedback Equalization and Viterbi Algorithm Detection for Voiceband Data Transmission-Part II", IEEE Transactions of Communications, Vol. COM-24, No. 11, November 1976, pp. 1238–1245; and A. J. Viterbi, "Error Bounds for Convolutional Codes and Asymptotically Optimum Decoding Algorithm", IEEE Transactions on Information Theory, Vol. IT-13, April 1976, pp. 260-269.

The operation of the Viterbi decoder 35 used in the present invention is as follows. The transmitted signal points shown in FIG. 3 can be represented by the complex numbers $$A(k) = c(k) + jd(k)$$

where c(k) and d(k) are the inphase and quadrature components of the baseband transmitted signal points. The transmitted signal is corrupted by noise in the channel and the received signal has the form $$R(k) = A(k) + V(k)$$

where V(K) is the Gaussian noise. The partial response encoding which is implemented at the receiver by the adaptive equalizer 19 generates the sequence $$C(k) = R(k) + R(k-1)$$

In the absence of noise, this generates the set of signal points shown in FIG. 7 which consists of an 11 by 11 rectangular grid with three points missing at each corner. These noiseless points are $$S(k) = A(k) + A(k-1)$$

Figure 8:
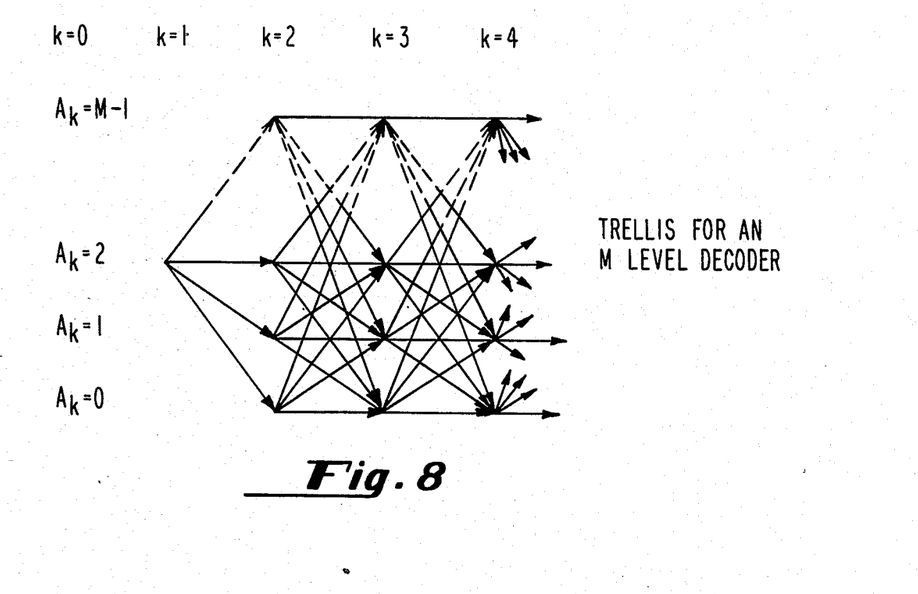
FIG. 8 illustrates the operation of an M level Viterbi decoder as used in the present invention.

The last uncoded symbol A(k−1) is called the state of the encoder. Thus the encoder can have 32 possible states, one for each point shown in FIG. 1. The transitions between states at successive time intervals are represented by a so-called "trellis" as shown in FIG. 8 and is well-known to those skilled in the data communications art. The Viterbi decoder finds the path through the trellis that minimizes the metric $$U(k) = \sum_{n=0}^{k} |R(n) - S(n)|^2$$

Letting $R(n) = r_I(n) + jr_Q(n)$ and $S(n) = S_I(n) + js_Q(n)$ yields $$U(k) = \sum_{n=0}^{k} (r_I(n) - s_I(n))^2 + \sum_{n=0}^{k} (r_Q(n) - s_Q(n))^2$$

If the set of points in FIG. 7 contained all 11 by 11 = 121 points, then $s_I(n)$ and $s_Q(n)$ could be selected independently and separate six level decoders could be used for the inphase and quadrature channels. This is not the case in the present invention since three points are mssing at each corner so an ideal decoder would require 32 states. The decoder computational requirements are proportional to the square of the number of states. The complexity of an ideal 32 state decoder is too great to be economically practical so in the present invention two separate and independent six level inphase and quadrature decoders are used to allow the decoding function to be economically performed while only at the risk of a slight loss in decoding accuracy.

The Viterbi decoders of the present invention operate as follows. Let U(k, m, i) be the cumulative metric at time k and state m at time k coming from the best path to state i at time k−1. The metric of the best path to state m at the time k will be denoted by U(k, m). This path is called the survivor to state m at time k. Each six level decoder computes for each state m the metrics of the paths from each of the six states at time k−1, that is $$U(k,m,i) = U(k-1,i) + (r(k-1) - s(k-1))^2; i=0,\ldots 5$$

The surviving path to state m comes from the state is that minimizes this expression. In theory, no symbol decisions should be made until the entire transmitted sequence is received. In practice, the surviving paths must be truncated because of storage limitations. For example, in one embodiment of the invention, the paths were truncated after 35 baud.

The Viterbi decoders are implemented by firmware using a bit-slice microprocessor at the receiver with a 12 bit word length. The processor is similar to those used for the transmitter and receiver.

While the present invention has been described in considerable detail, it is understood that various changes and modifications would occur to those skilled in the art. Accordingly, the foregoing description of the preferred embodiment is intended to be descriptive, but not limitive, of the invention which is fully defined by the following claims.

What is claimed is:

1. A system for communicating data in a data stream comprised of binary bits, at data rates up to at least 14,400 bits per second over a band limited communication channel, said system comprising a transmitter for encoding and transmitting bits over said chanel and a receiver for receiving and decoding bits received from said transmitter over said channel, said transmitter comprising means for encoding data bits, said means for encoding comprising:

means for grouping sequences of five bits from the bit stream as bauds;

means for locating the identical sequence of five bits corresponding to each baud in a constellation of the 32 possible sequences of five bits, said constellation being divided into four quadrants, the first and second bits of each of the eight groupings of bits in each quadrant being identical, and the four groups of the quadrants, each comprising the eight possible sequences of the latter three bits of each said baud, being symmetrical;

means for encoding the first two bits of each baud such that identification of the baud with one of said four quadrants is possible at said receiver;

means for generating a quadrature amplitude modulated (QAM) signal, said signal varying in dependence on the location of the encoded first two bits and the latter three bits within said constellation; and means for transmitting the generated QAM signal over the band limited communications channel; and said receiver comprising means for receiving the QAM signal from the communications channel, and means for reconstituting the individual bauds therefrom to generate the original bit stream, including means for decoding the first two bits.

2. The system of claim 1 wherein said first two bits of each baud in said bit stream are encoded in accordance with the value of the first two bits of the preceding baud.

3. The system of claim 2 wherein said first two bits are encoded according to the following rules:

EA(I)=EA(I−1).XOR.AS(I).XOR.(EB(I−1).AND.BS(I)); and

EB(I)=EB(I−1).XOR.BS(I), wherein the quantity (EB)I−1).AND.BS(I)) is a carry bit, AS(I) and BS(I) are the current first two bits and EA(I−1) and EB(I−1) are the previously encoded first two bits.

4. The system of claim 1 where said constellation is substantially as follows:

```
                   101  100 | 100  101
                    x    x  |  x    x
   A  B  CDE                                A  B
   1  0  000  001  110 | 110  001  000
            x    x    x |  x    x    x     0  0
           010  011  111 | 111  011  010
            x    x    x |  x    x    x
          ─────────────────────────────
           010  011  111 | 111  011  010
            x    x    x |  x    x    x
   A  B   000  001  110 | 110  001  000     A  B
   1  1    x    x    x |  x    x    x      0  1
                   101  100 | 100  101
                    x    x  |  x    x
``` wherein the bits marked A and B correspond to said first two bits and the bits marked C, D, and E correspond to said latter three bits.

5. A method for communicating data in a data stream comprised of binary bits, at data rates up to 14,400 bits per second over a band limited communication channel, comprising a transmitting step and a receiving step, said transmitting step comprising the steps of:

grouping sequences of five bits of the bit stream as bauds;

locating the identical sequence of five bits of each baud in a constellation of the 32 possible groupings of five bits, said constellation being divided into four quadrants, the first and second bits of each of the eight groupings of bits in each quadrant being identical, and the four groups of the eight possible arrangement of the latter three bits of each said baud being symmetrical in each quadrant;

encoding the first two bits of each baud such that identification of the baud with one of said four quadrants is possible at said receiver;

generating a quadrature amplitude modulated (QAM) signal responsive to the location of each of said bauds within said constellation; and transmitting the QAM signal over the band limited communications channel; and said receiving step comprising the steps of receiving the QAM signal from the communications channel and recovering the individual bauds therefrom to generate the original bit stream.

6. The method of claim 5 wherein said encoding of the first two bits of each baud is performed in a manner responsive to the values of the first two bits of the preceding baud.

7. The method of claim 6 wherein said first two bits are encoded according to the following rules:

EA(I)=EA(I−1).XOR.AS(I).XOR.(EB(I−1-).AND.BX(I)); and

EB(I)=EB(I−1).XOR.BS(I), wherein the quantity (EB)I−1).AND.BS(I)) is a carry bit, AS(I) and BS(I) are the first two bits of the current baud, and EA(I−1) and EB(I−1) are the first two bits of the preceeding baud.

8. The method of claim 5 wherein said constellation is substantially as follows:

```
                   101  100 | 100  101
                    x    x  |  x    x
   A  B  CDE                                A  B
   1  0  000  001  110 | 110  001  000
            x    x    x |  x    x    x     0  0
           010  011  111 | 111  011  010
            x    x    x |  x    x    x
          ─────────────────────────────
           010  011  111 | 111  011  010
            x    x    x |  x    x    x
   A  B   000  001  110 | 110  001  000     A  B
   1  1    x    x    x |  x    x    x      0  1
                   101  100 | 100  101
                    x    x  |  x    x
``` wherein the bits marked A and B correspond to said first two bits and the bits marked C, D, and E correspond to said latter three bits.

9. A modem clock recovery circuit for recovering a modem clock signal from a signal modulated according to a quadrature amplitude modulation (QAM) method, said modulated signal being transmitted at a nominal data rate, comprising:

means for selecting spectral components about the upper and lower Nyquist frequencies of said modulated signal;

means for summing said spectral components;

means for squaring the output of said means for summing, said means for squaring having an output signal including frequency components at the sum, difference and second harmonic frquencies; and means for selecting the difference component of the output of said means for squaring as said modem clock signal.

10. The modem circuit of claim 9 comprising means for slicing the output of said selecting step to a desired logic level.

11. The modem circuit of claim 9 further comprising means for generating a phase-locked loop signal responsive to the difference component of the output of said means for squaring.

12. The modem circuit of claim 9 wherein said spectral components are selected by plural second order bandpass filter means, each having a bandwidth of approximately 40 Hz at the half power points, and wherein said nominal frequency is 2,880 Hz.

13. The modem circuit of claim 9 further comprising transversal equalizer means for converting the received QAM signal to produce a partial response QAM signal.

14. A method for recovering a modem clock signal from a signal modulated according to a quadrature amplitude modulation (QAM) method, said modulated signal being transmitted at a nominal data rate, comprising the steps of:

selecting spectral components about the upper and lower Nyquist frequencies of said modulated signal;

summing said spectral components;

squaring the output of said summing step, in order to provide frequency components at the sum, difference and second harmonic frequencies; and selecting the difference component of the output of said squaring step as said modem clock signal.

15. The method for recovering a modem clock signal of claim 14 comprising the additional step of slicing said difference component to a desired logic level.

16. The method for recovering a modem clock signal of claim 14 comprising the step of generating a phase-locked loop signal responsive to said difference component of the output of said squaring circuit.

17. The method for recovering a modem clock signal of claim 14 wherein the step of selecting said spectral components is performed by plural second order bandpass filter means each having a bandwidth of approximately 40 Hz at the half power points, and wherein said nominal frequency is 2,880 Hz.

* * * * *